United States Patent [19]
Muchel

[11] 4,365,871
[45] Dec. 28, 1982

[54] OPTICAL SYSTEM FOR MICROSCOPES

[75] Inventor: Franz Muchel, Königsbronn, Fed. Rep. of Germany

[73] Assignee: Carl Zeiss-Stiftung, Heidenheim on the Brenz, Fed. Rep. of Germany

[21] Appl. No.: 148,820

[22] Filed: May 12, 1980

[30] Foreign Application Priority Data

May 17, 1979 [DE] Fed. Rep. of Germany ....... 2919924

[51] Int. Cl.³ .................... G02B 3/00; G02B 15/02; G02B 21/02
[52] U.S. Cl. .................... 350/414; 350/422; 350/453
[58] Field of Search ............... 350/414, 422, 431, 453

[56] References Cited

U.S. PATENT DOCUMENTS

| | | | |
|---|---|---|---|
| 1,446,634 | 2/1923 | Bell et al. | 350/431 |
| 3,437,398 | 4/1969 | Muller et al. | 350/422 X |
| 3,481,665 | 12/1969 | Rosenberger | 350/414 |
| 3,790,255 | 2/1974 | Shoemaker | 350/453 X |

FOREIGN PATENT DOCUMENTS

122304 1/1954 U.S.S.R. ............... 350/453

*Primary Examiner*—John K. Corbin
*Assistant Examiner*—Scott J. Sugarman
*Attorney, Agent, or Firm*—Stonebraker, Shepard & Stephens

[57] ABSTRACT

An optical system for microscopes to enable microscopes having objectives of infinite exit vertex focal length to be made compatible with microscopes having objectives of finite exit vertex focal length, and vice versa, thus enabling the microscope user having a microscope of one kind to continue to use his supply of interchangeable objectives if he acquires a microscope of the other kind, and enabling microscope manufacturers to stock only one style of objective even if both styles of microscopes are being manufactured or if a transition is being made from one style to the other. The invention provides adapters having optical elements which enable an objective of the finite exit vertex focal length kind to be used with a microscope designed for an objective of the infinite exit vertex focal length kind, or vice versa, the optical system of the adapter providing adequate compensation or correction for aberrations.

15 Claims, 30 Drawing Figures

Fig.12c — Fig.3, CHV=1,4% / Fig.2, CHV=0

Fig.12b — A3, CHV=−0,2% / TL20, CHV=−1,6%

Fig.12a — Obj. U₂, CHV=1,6%

Fig. 13c
Fig. 3, CHV = 1,4 %
Fig. 2, CHV = 0,1 %

Fig. 13b
A 3, CHV = -0,1 %
TL 20, CHV = -1,6 %

Fig. 13a
Obj. $U_3$, CHV = 1,5 %

Fig. 15a  Obj. $U_2$, CHV = 1,6 %

Fig. 15b  A 5, CHV = −0,2 %  TL 15, CHV = −1,6 %

Fig. 15c  Fig. 7, CHV = 1,4 %  Fig. 8, CHV = 0

Fig.16c
Fig.5, CHV=1,4%
Fig.6, CHV=1,4%

Fig.16b
A 14, CHV=0
T L 11,10, CHV=0

Fig.16a
Obj. E, CHV=1,4%

OPTICAL SYSTEM FOR MICROSCOPES

BACKGROUND OF THE INVENTION

The present invention relates to an optical system for microscopes which makes it possible to make the objectives of different microscope systems interchangeable.

The known microscopes at present available on the market operate in accordance with different, incompatible systems which differ (a) in the exit vertex focal length of the exchangeable objectives used and (b) in the state of correction of the interchangeable objectives.

Heretofore it has been generally customary to use objectives of finite vertex focal length in microscopes. These objectives produce directly an intermediate image of the object which is observed by means of the eyepiece. Objective and eyepiece are a defined distance apart, which distance is determined by the position of the intermediate image, i.e., in microscopes with objectives of infinite vertex focal length the mechanical tube length is a given size.

In general, in the case of microscope objectives of finite vertex focal length (referred to hereinafter as objectives of the first type) the transverse chromatic aberration is not fully corrected. The degree of correction differs from manufacturer to manufacturer. The transverse chromatic aberration which is still present in the intermediate image is compensated for by special eyepieces.

During the last few years microscope objectives with infinite vertex focal length have been developed. In them there is a parallel ray path behind the objective so that it is readily possible to introduce supplementary optics, such as beam splitters, filters, etc. In the case of microscope objectives of infinite vertex focal length (hereinafter referred to as objectives of the second type) the intermediate image is produced by an additional lens system, the so-called tube lens system.

It is clear that in microscope objectives of the second type the mechanical tube length is not a defined size; it can be of different size depending on the requirements.

Microscope objectives of infinite vertex focal length which are so corrected that an aberration-free intermediate image is produced in combination with the tube-lens system are also known.

If now a manufacturer of microscopes having objectives of the first type would like to change to microscopes having objectives of the second type, this would be very expensive for him to do, because for a rather long period of transition he would have to take into account the desire of the users for the possibility of expanding their old instruments, and therefore the manufacturer must for a long time offer components of both systems. Even then, however, the problem arises for the user that upon transfer to microscopes having objectives of the second type, his previous interchangeable objectives cannot be used, due to the lack of compatibility.

It is known from U.S. Pat. No. 3,132,200 to combine non-fully corrected microscope objectives which have infinite exit vertex focal length with a correction member which is installed fixed in the tube and produces an aberration-free intermediate image. The correction member however, due to its monochromatic aberrations, has an optimum corrective effect only for one interchangeable objective of the specific series of objectives. The introduction of a positive coma by the correction member results in a positive astigmatism at this place. Both aberrations are particularly disadvantageous in case of displacements of the pupil such as occur upon focusing movements between objective and tube lens and upon the introduction of beam splitters or filters.

From German Auslegeschrift (Provisional Patent) No. 1,472,082 it is known to use a fixed correction member, in the form of a negative cemented component, which increases the vertex focal length of interchangeable objectives and compensates for field curvature and astigmatism. Its 5× magnifying action is adapted to the use of a special series of objectives of low magnifying power.

In German Pat. No. 2,047,673 there is described also a fixed correction member which, with a correcting action similar to the one proposed in the above mentioned Auslegeschrift No. 1,472,082, shifts the exit vertex focal length of the interchangeable lenses to infinity. A fixed positive single lens, also provided in the tube, corrects the transverse chromatic aberration of the lenses and produces an aberration-free intermediate image. This correction member also changes the linear magnification of the interchangeable objectives.

In all of these known correction systems the correction member is integrated in fixed position in the tube and thus establishes the type of series of objectives to be used. Re-equipping of the system by installing other correction systems is time-consuming and tedious, and thus expensive. These correction systems permit compatibility of different systems therefore only in the sense that new series of objectives can be used by a single re-equipping of older tubes.

SUMMARY OF THE INVENTION

The object of the present invention is to provide an optical system for microscopes which makes microscope objectives of the first and second types completely compatible. In this way it becomes possible to use microscope objectives of finite vertex focal length in microscopes which are designed for objectives of infinite vertex focal length. At the same time these microscope objectives of infinite vertex focal length are to be capable of use in microscopes which are developed for objectives with finite vertex focal length. The state of correction of the microscope objectives of the first and second types with respect to the chromatic difference in magnification in the intermediate image can be different when using the new optical system.

This objective is achieved in accordance with the invention by providing adapters as herein disclosed.

For the manufacturer there is the advantage, inter alia, that when changing a system it is not necessary during the transitional phase to manufacture the objectives of both types and keep them in stock, since the series of objectives of the one type are always compatible with the series of objectives of the second type, by combination with the corresponding adapters. Thus the manufacturer can supply the user of objectives of the first type with the objective series of the second type together with the corresponding adapters which may also already be installed in the objective housing.

On the other hand, the user can easily effect the transfer to the objective system of the second type while retaining his interchangeable objectives of the first type, since they need merely be equipped with the adapters provided for them.

The adapters can be so mounted that an easily replaceable attachment to the objective housing is made possible. In such case, the user can himself provide those objectives which he wishes to make available for different use with the adapter necessary for this.

If a manufacturer of a microscope system which uses objectives of finite exit vertex focal length which produce an intermediate image which suffers from transverse chromatic aberration wants to change over to a system which is based on objectives with infinite exit vertex focal length having completely corrected intermediate image, it is then very advantageous to select the adapters with the tube lens of the new system identical with respect to the amount of their refractive power and their dispersion. In this way the result is obtained, on the one hand, that the linear magnification of lenses of the first type does not change when they are used on new tubes. On the other hand, there is obtained for this case a rather simple dependence of the chromatic aberrations in the intermediate image on the system parameters, which can then easily be optimized with respect to a color-free intermediate image.

In this connection, it is found advantageous to arrange the tube lenses of the instruments of the second type with their principal planes at a distance from the object plane which corresponds to 0.5 to 1.3 times their focal length. By means of the dispersion of the adapter or of the tube lens, the influence of the position of the tube lens on the transverse chromatic aberration in the intermediate image can be easily compensated for in this region, taking as basis the presently customary values for the color magnification error of objectives of the first type. By a suitable selection of available types of glass with respect to their dispersion it is then possible to develop the tube lens and the adapters, with the avoidance of cemented components, as single lenses in order to obtain the reciprocal chromatic correction of the intermediate image.

If an additional afocal adapter is provided which in the form of a cemented component produces the corresponding chromatic correction, then the compatibility of the systems is broadened also to cases in which chromatically uncorrected objectives of finite exit vertex focal length, which are used in combination with a tube optic producing a parallel ray path (Telan system), are replaced by aberration-free interchangeable objectives of infinite exit vertex focal length.

It is then possible to combine the optical properties of the negative member of the Telan system and those of the positive adapter for the objectives of infinite exit vertex focal length in a dispersive afocal adapter. In that way, the number of lens surfaces and thus the reflections in the tube are reduced. The negative achromatic member required for the objectives of finite exit vertex focal length is fastened to these objectives in the form of an achromatic adapter.

If the dispersive afocal adapter is integrated in the tube, then the production of a color-free intermediate image is possible in simple fashion in combination with the remaining positive achromatic tube lens. The dependence of the transverse chromatic aberration in the intermediate image on the position of the dispersive member furthermore affords the possibility of achieving, by simple means the desire for complete elimination of transverse chromatic aberration individually for all objectives, since in the case of certain uses (for instance in microphotography), even small color aberrations frequently make themselves negatively noticeable and cannot be completely excluded. This is because, for instance, objectives of the same series but with different linear magnification never have exactly the same state of chromatic correction.

This is achieved by providing adjusting elements by which the transverse chromatic aberration of the intermediate image is continuously variable.

It is particularly advantageous if the adjusting element consists of an axially displaceable afocal dispersive member. In this way it is possible, without displacing the plane of the intermediate image, i.e. with constant sharpness of image, and merely by displacing one member, to compensate for small deviations in the chromatic correction of individual objectives, i.e. to obtain a completely color-free intermediate image.

In another advantageous embodiment, the dispersive member is located in the parallel ray-path region between the objective and an achromatic tube-lens system. In that case the displacement of the adjusting element has no effect on the monochromatic aberrations or the longitudinal chromatic aberrations. After removal of the adjusting element, it is possible easily to adapt objectives of the first type whose chromatic correction was effected without consideration of the afocal correction member to the tube having the remaining achromatic tube-lens system.

The inventive concept will be explained in further detail with reference to FIGS. 1 to 9 of the accompanying drawings, which show diagrammatically the window ray path of different microscope systems from object up to intermediate image.

DESCRIPTION OF THE PREFERRED EMBODIMENTS

FIGS. 1-9 are intended as schematic diagrams of portions of microscopes, including the objectives 1 and 2 (also denoted E and U, respectively) and other parts for producing at 7 or 8 an intermediate image of the object 6 which is being examined or observed by means of the microscope. Objectives having a finite vertex focal length are here identified for convenience by the letter E (the initial letter of the German word Endlich) and those having an infinite vertex focal length are identified by the letter U (for Unendlich).

Figure 1:
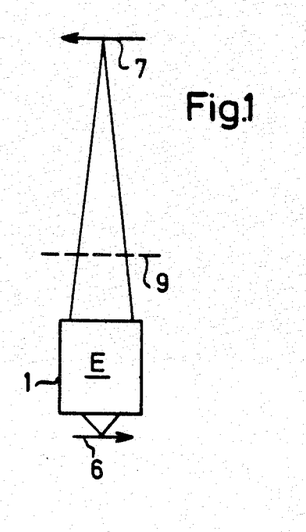
FIG. 1 is a schematic diagram of a portion of a microscope, illustrating the image formation of the object with an objective of finite exit vertex focal length.

In FIG. 1, an objective 1 or E of finite vertex focal length produces in the finite range an intermediate image 7 of the object 6 which suffers from transverse chromatic aberration and thus corresponds to a system of the first type. The line 9 represents the mechanical limitation of the objective housing.

Figure 2:
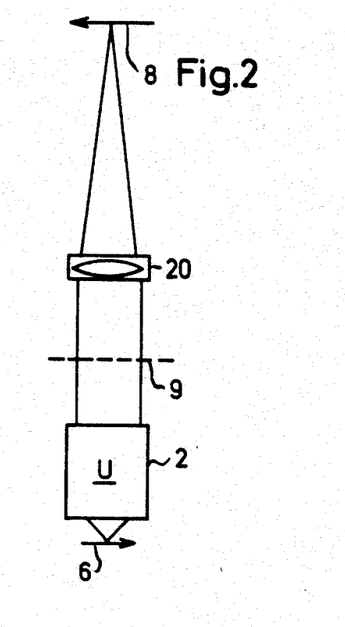
FIG. 2 is a similar diagram illustrating the formation of an image with an objective of infinite exit vertex focal length.

FIG. 2, on the other hand, shows a microscope objective 2 or U of infinite vertex focal length by which the object 6 is focussed at infinity. A tube lens system 20 with under-corrected longitudinal chromatic aberration produces the color-free intermediate image 8 without influencing the monochromatic image defects which have already been fully corrected in the objective 2.

Figure 4:
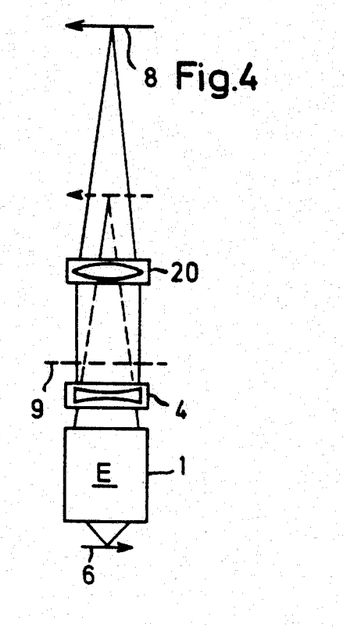
FIG. 4 is a similar diagram illustrating the development of the image with an adapted objective of finite exit vertex focal length.

The refractive power of the tube lens sytem 20 is so selected that an adapter 4 having a negative refractive power of the same amount and the same dispersion as a traditional objective 1, on the housing of which it is fastened, can replace the objective 2 of FIG. 2, as seen in FIG. 4. By means of the adapter 4 which shifts the vertex focal length of traditional objectives 1 to infinity, the latter can therefore be used on microscope tubes of the second type without changing their linear magnification. The intermediate image is free of color.

Figure 3:
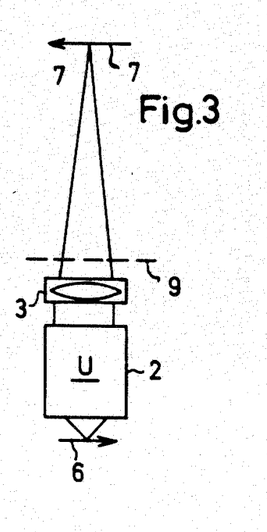
FIG. 3 is a similar diagram illustrating the formation of an image with an adapted objective of infinite exit vertex focal length.

Referring now to FIG. 3, if an objective 2 of infinite vertex focal length is provided with an adapter 3 which corresponds to the adapter 4 FIG. 4 except for the sign of the refractive power and thus has the same refractive power as the tube-lens system 20, then an objective of finite exit vertex focal length such as the objective 1 in FIG. 1 can be replaced by this combination without changing the linear magnification. The intermediate image 7 in FIG. 3 has the same transverse chromatic aberration as that in FIG. 1 which, in contradistinction to the longitudinal chromatic aberration, is dependent on the position of the adapter 3 (distance from the pupil of the objective).

In the system illustrated in FIGS. 1 to 4, the number of free parameters is seen. Since one starts from the assumption that both objective classes U (infinite) and E (finite) are completely corrected with respect to the monochromatic image defects and the focal length of the adapters 3 and 4 and of the tube-lens system 20 lies corresponding to the current values for optical tube lengths employed, within the decimeter range, one can dispense with a consideration of the lens shapes (radii), which are without effect on the chromatic image defects, in connection with the adapters or the tube optics. The radii can, rather, be so selected that the principal planes of the adapters with the different objectives always assume the position which is necessary in order to obtain the desired chromatic correction without bringing the adapters themselves into these positions.

Starting from the instantaneous value for the transverse chromatic aberration in the intermediate image 7 of FIG. 1 thus (a) the dispersion, which is preferably the same for the adapters 3, 4 and for the tube-lens system 20, (b) the position of the principal planes of the adapters and of the tube lens system, and (c) the state of chromatic correction of the lenses, should all be so selected that for the arrangements in accordance with FIGS. 2 and 4 there is obtained a chromatically corrected intermediate image 8, and for the arrangement of FIG. 3 there is obtained the same transverse chromatic aberration in the intermediate image 7 as in FIG. 1.

This is effected in the manner that, when selecting these values, one complies essentially with the following relationship:

$$\sum_i \frac{L_i}{v_{di} \cdot f_i} = CHV \quad (1)$$

In this equation, $v_d$ = Abbe number of the glasses used in the lenses or cemented components, f = the focal length of the corresponding lenses or cemented components, L = the distance of their principal planes from the exit pupil of the objectives used in combination with the tube-lens system, and CHV = the transverse chromatic aberration of these lenses which is to be compensated for.

Figure 10:
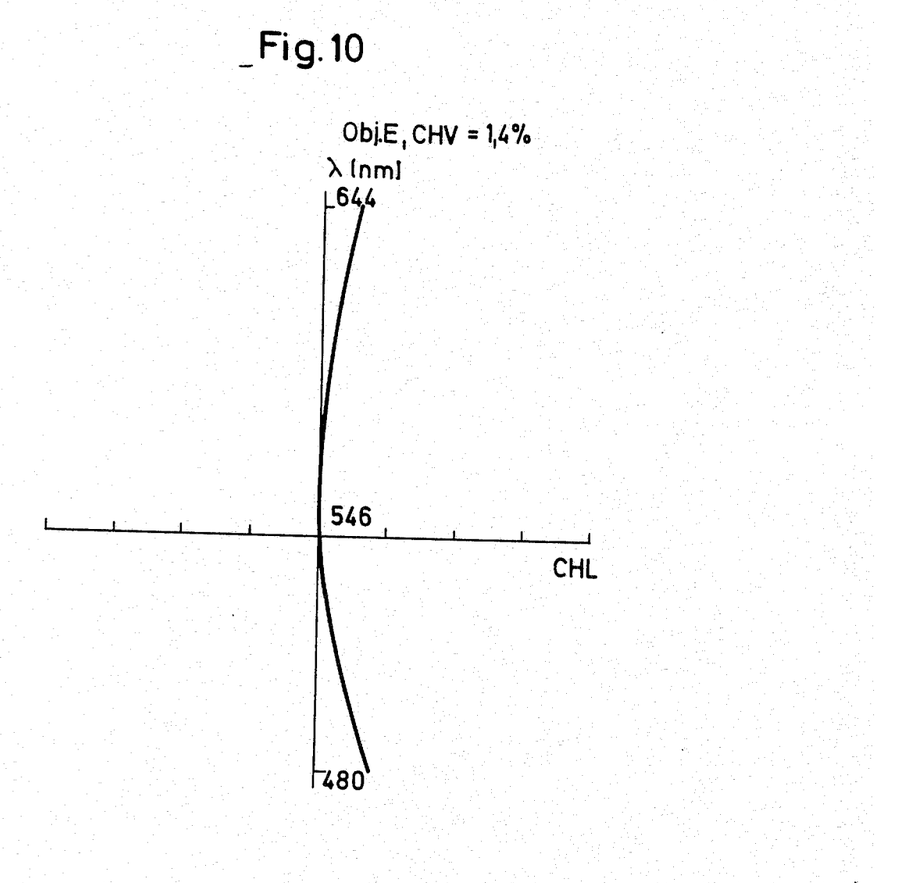
FIG. 10 is a graph showing the chromatic deviation for one of the objectives.

The graphs in FIGS. 10-14 show this. FIG. 10 shows the normalized course of the longitudinal chromatic deviation (CHL) for an objective E of the first type (achromatic objective with linear magnification of 10×, aperture 0.22, exit vertex focal length 160 mm), whose intermediate image has a chromatic difference in magnification (CHV) of 1.4%. For the corresponding objective U of second type, the course of the CHL (longitudinal chromatic aberration) is shown in FIG. 11a. This objective is so designed (CHV=1.5%) that a positive single lens having the focal length f=160 mm, the course of the CHL of which is shown in FIG. 11b (f=160 mm, $v_d$=20.4), compensates as tube-lens at a distance A=0.45 f from the object plane (FIG. 2) for the chromatic defects of the objective U and as adapter on the objective housing (FIG. 3) produces an intermediate image having a CHV of 1.4%.

Figure 11A:
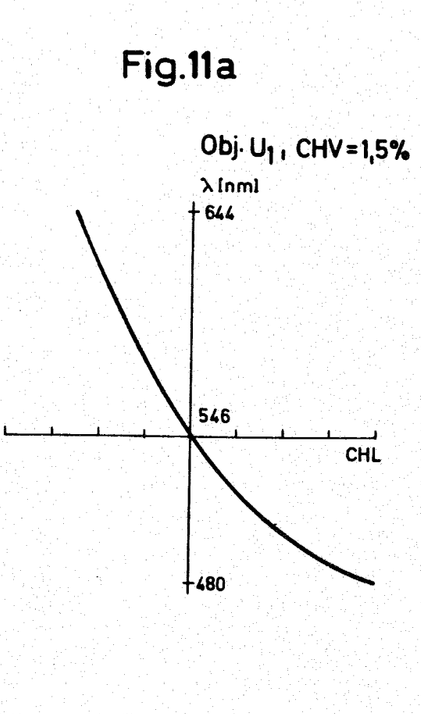
FIGS. 11a, 11b, and 11c are graphs illustrating the chromatic characteristics of certain lenses used according to the invention.
Figure 11B:
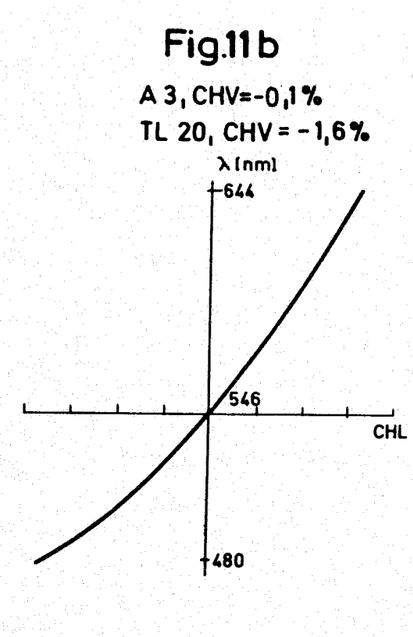
Figure 11C:
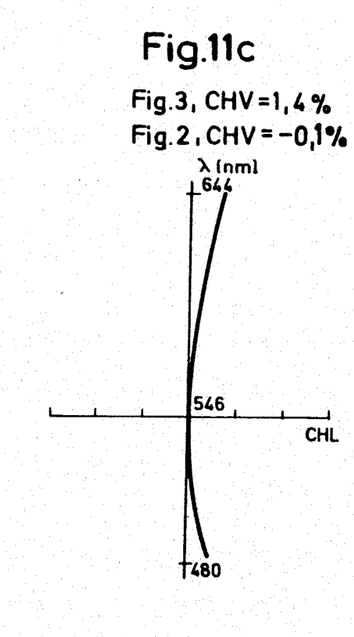

FIG. 11c shows the resultant course of the CHL, which due to the parallel ray path is independent of the position of the lens. The linear magnification and the aperture of the objective U agree with the corresponding values of the objective E.

Figure 12A:
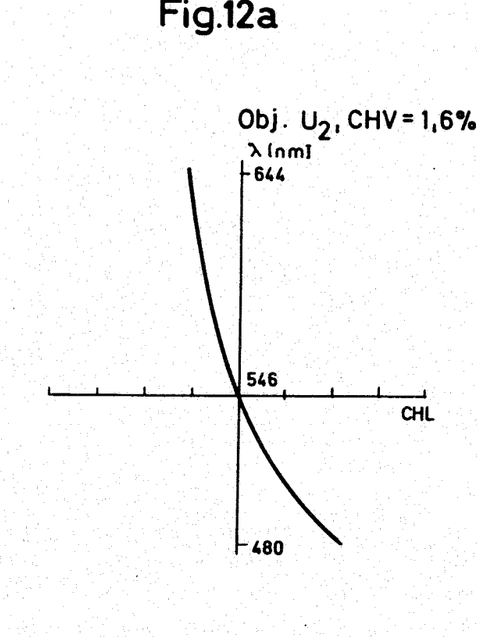
FIGS. 12a, 12b, 12c, 13a, 13b, 13c, 14a, 14b, 14c, 15a, 15b, 15c, 16a, 16b, and 16c are other graphs illustrating the chromatic characteristics of other lenses or optical elements used according to the invention.
Figure 12B:
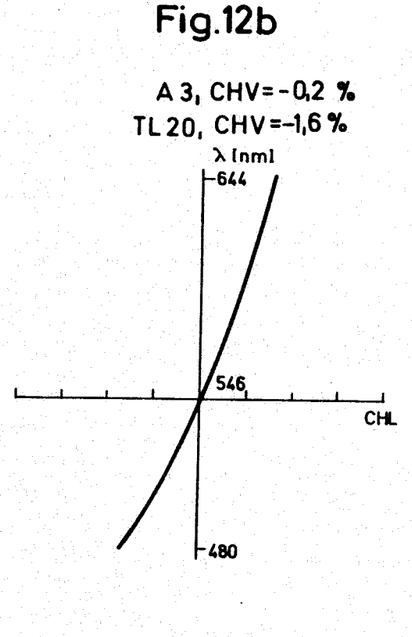
Figure 12C:
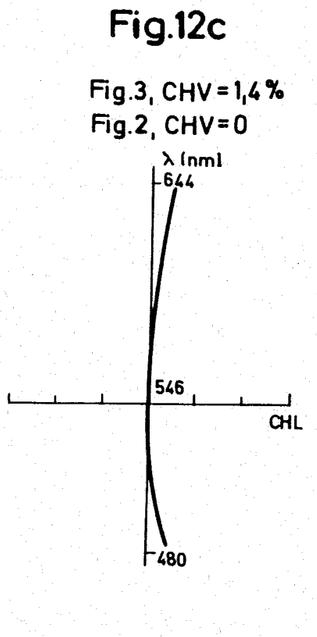
Figure 13A:
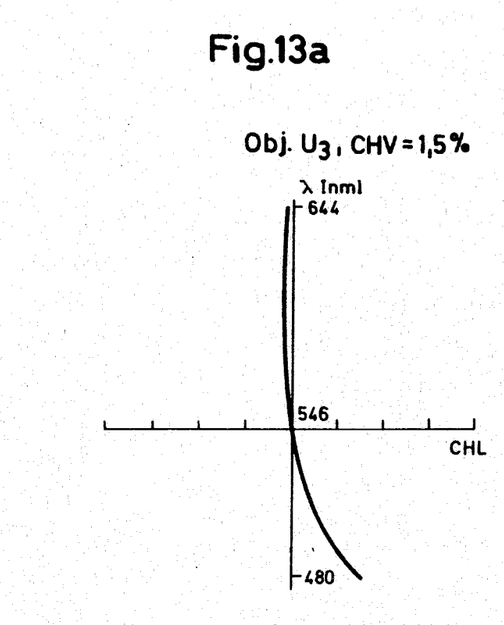
Figure 13B:
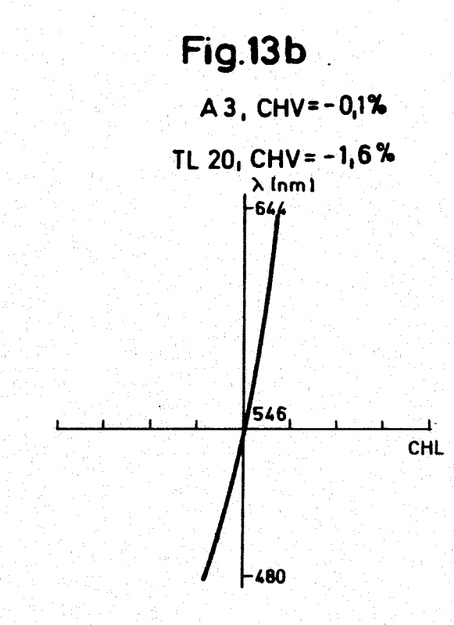
Figure 13C:
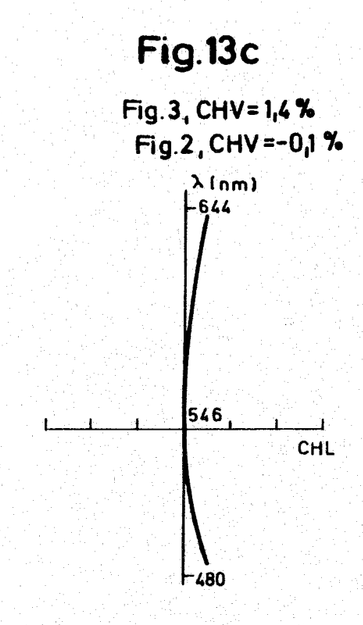

If upon the designing of the objective U one selects other chromatic states of condition such as, for instance, shown in FIG. 12a or FIG. 13a then, when using suitable material for adapter 3 and the tube lens 20 ($v_d$=41.5 for FIG. 12b; $v_d$=84.5 for FIG. 13b) as well as the position thereof (L=105 mm in FIG. 12b; L=220 mm in FIG. 13b) while retaining the focal length (f=160 mm), in each case the desired intermediate-image correction can nevertheless be obtained in the sense of compatibility with the objective E corrected in accordance with FIG. 10. Within the scope of equation 1, naturally also other parameters, for instance L, can be taken as basis and the objective U can be calculated correspondingly for the optical system. If the desired compensating of the CHV by means of single lenses (i=1) requires values for the dispersion which are not obtained with available glasses, then the adapters and the tube lens may be dimensioned, for instance, as cemented components, so that the desired dispersive results are obtained.

Figure 14A:
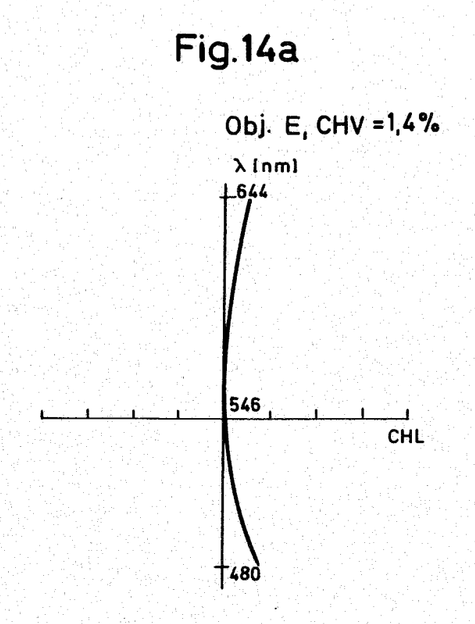
Figure 14B:
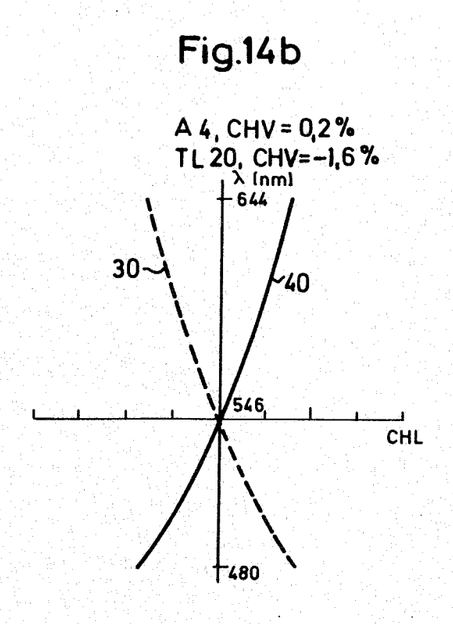
Figure 14C:
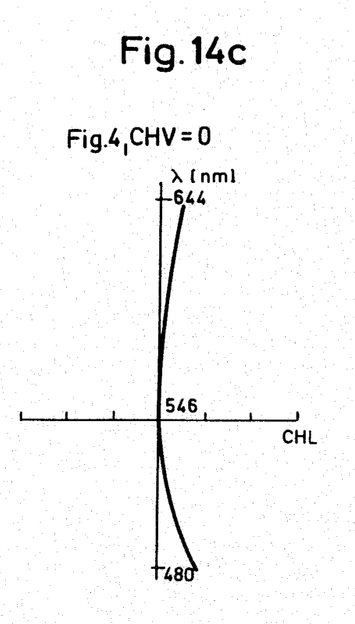

The three parts of what may be described for convenience as FIG. 14 (i.e., FIGS. 14a, 14b, and 14c) relate to the chromatic correction of the system shown in FIG. 4. In this case the longitudinal chromatic aberrations 30 of the negative adapter 4 and the longitudinal chromatic aberrations 40 of the positive tube lens 20 compensate for each other on basis of their equal dispersion ($v_d = 41.5$). As a result, in FIG. 14c there is the same course of the CHL as in FIGS. 14a and 10. The transverse chromatic aberration (CHV) in the intermediate image of FIG. 14c becomes zero since the slight contribution to the CHV of the adapter 4 which is arranged in the vicinity of the objective pupil as compared with the positive adapter 3 in FIG. 12b, enters therein with reversed sign, and thus the difference in the CHV of the two types of objectives E and U is compensated for.

The values for the CHV in FIGS. 11–14 can all be calculated from equation 1 if the fact is taken into account that the adapters 3 and 4 are at approximately a distance of 10 mm from the objective pupil.

Figure 5:
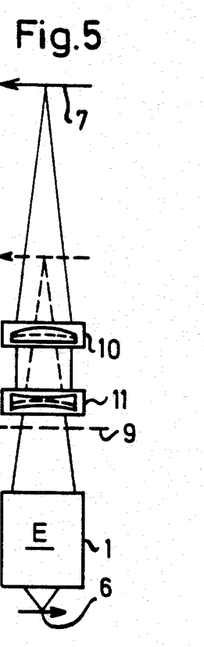
FIG. 5 similarly shows the formation of the image by an objective of finite exit vertex focal length with Telan system.
Figure 6:
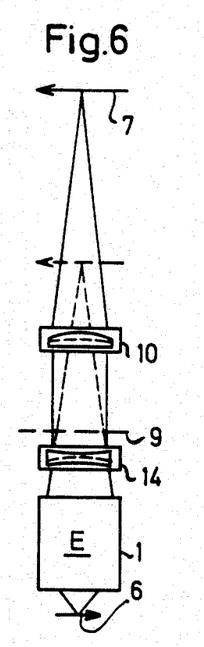
FIG. 6 shows the same development of the image with modified tube optics and adapted objective of finite exit vertex focal length.
Figure 7:
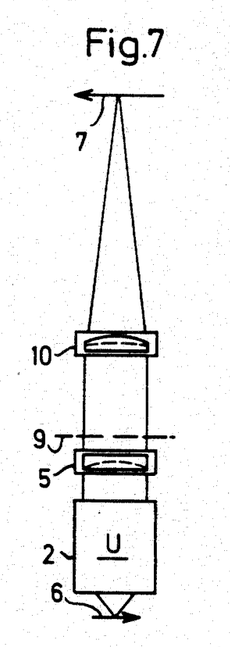
FIG. 7 shows the same formation of image as FIG. 6 but with adapted objective of infinite exit vertex focal length.

FIGS. 5–7 illustrate obtaining mutual compatibility of the above described systems by means of an achromatic negative adapter 14 and another afocal adapter 5, it being assumed that the system of first type contains the so-called Telan system which adapts the object-image distance by means of a positive achromatic member (10) and a negative achromatic member (11) to the stand dimensions. Since the use of objectives E on new tubes of the second type by means of the negative adapter 4 was already sketched in FIG. 4, only the replaceability of the two objectives types E and U on tubes of the system of the first type will be shown.

For this it is advisable to remove the negative member 11 (FIG. 5) of the Telan system from the tube whih is tailored to the objectives of the first type. On the housing of the objective 1 there is now applied a negative achromatic adapter 14 (FIG. 6) which restores the original condition shown in FIG. 5.

With this partially emptied tube there can, however, be combined an objective of the second type with the use of an afocal adapter 5 (FIG. 7) which has the same dispersive behavior as the adapter 3 in FIG. 3. In combination with the achromatic positive member 10 of the original Telan system, one again obtains an intermediate image 7 with transverse chromatic aberration.

Figure 8:
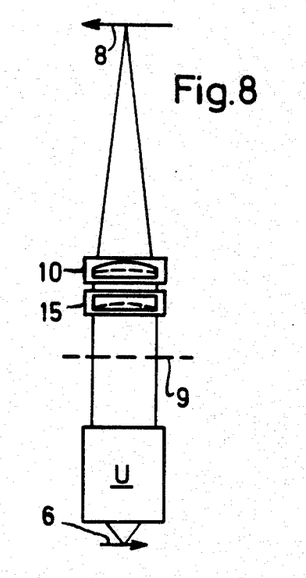
FIG. 8 shows the same development of the image as FIG. 7 with a differently modified tube optics.
Figure 9:
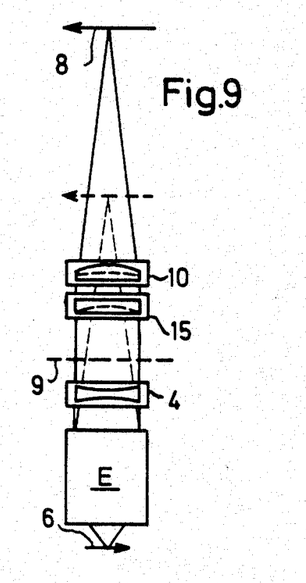
FIG. 9 shows the same formation of the image as FIG. 8 with adapted objective of finite exit vertex focal length.

Another meaningful possibility for adapting the objectibes E and U to such a tube is shown in FIGS. 8 and 9. Here the afocal member 15 having the dispersive properties of the adapter 5 is arranged in the tube in the vicinity of the achromatic member 10. This system has the same construction with respect to its optical action as the one shown in FIGS. 2 and 4, and differs merely by the fact that the refractive power and dispersion of the tube-lens 20 in FIGS. 2 and 4 are provided by the separate members 10 and 15.

As shown in FIGS. 8 and 9 objectives U of the second type without adapter (FIG. 8) and objectives E with the adapter 4 over-corrected with respect to its longitudinal chromatic aberration (FIG. 9) can be used on such converted tubes of the system of the first type. The resultant intermediate image is here free of color in FIGS. 2 and 4.

This solution at first glance is cumbersome as two cemented members are used rather than a single lens of the same action. However, it has the advantage that chromatic corrections can be effected in the intermediate image without affecting its position. In particular, a replaceable fastening of the member 15 is possible so that both states of correction of the intermediate image in accordance with FIGS. 6 and 7 respectively or in accordance with FIGS. 8 and 9 respectively can be obtained on a tube with the same objective.

Figure 8A:
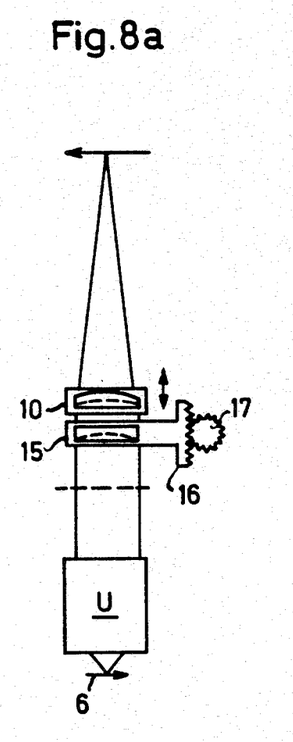
FIG. 8a is a view illustrating certain adjusting elements.
Figure 9A:
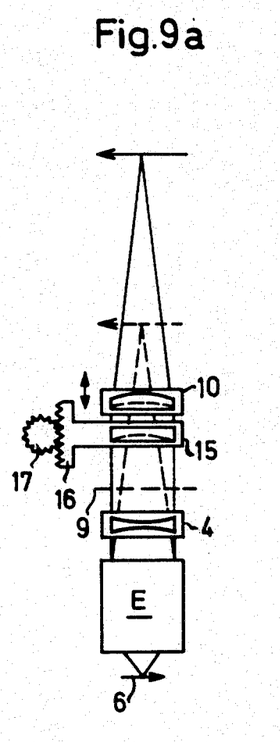
FIG. 9a is a view illustrating adjusting elements.

By axial displacement of the member 15 the transverse chromatic aberration in the intermediate image 8 can be completely compensated for in simple fashion, whereby, without displacing the focus plane, small differences in the state of correction of different objectives or manufacturing tolerances can be counteracted. In order to realize this possibility, which is particularly of interest for the color photography of microscopic objects, there are provided on the tube adjustment elements 16 and 17 (FIGS. 8a and 9a) by which the said longitudinal displacement of the afocal dispersive member 15 can be carried out continuously and in reproducible manner, i.e., with a graduated scale to permit setting and resetting to a desired position. Naturally, the use of such an element is possible not only in combination with the optical system outlined above. Even without providing adapters by which objectives of the first and second type are made compatible (for instance for non-compatible special microscopes), the use of adjusting elements is conceivable and meaningful for the complete elimination of the transverse chromatic aberration in the intermediate image.

The correction effects of the adapters illustrated by means of FIGS. 10 to 14 for the arrangements in accordance with FIGS. 1 to 4 can be transferred without difficulty to the arrangements according to FIGS. 5 to 9.

Figure 16A:
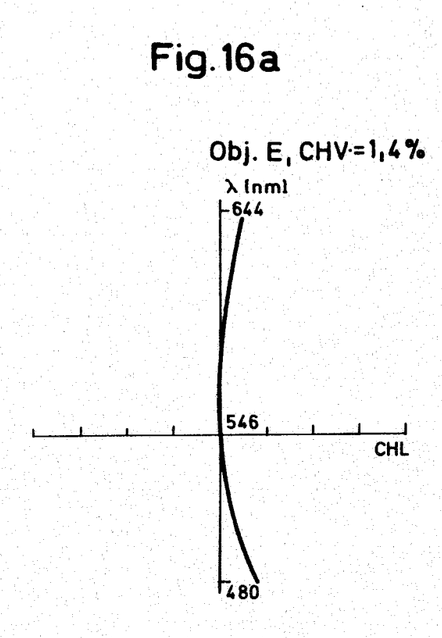
Figure 16B:
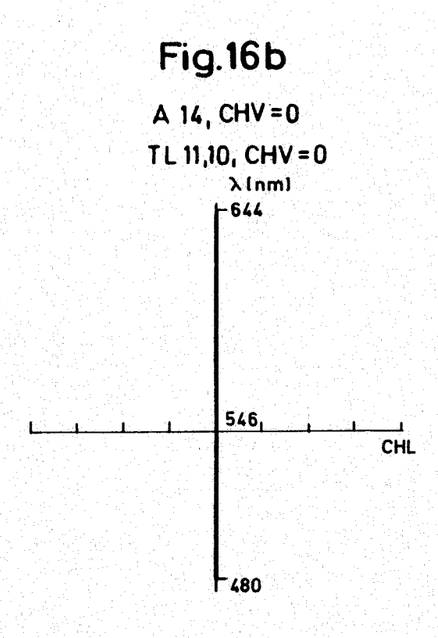
Figure 16C:
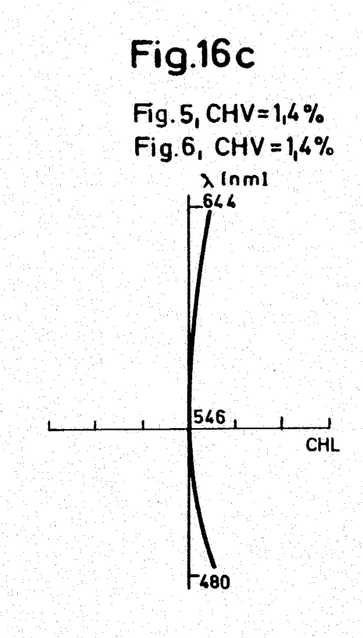

In this connection, FIG. 16 (i.e. 16a, 16b, and 16c) again shows the course of the CHL of the objective E as in FIG. 10. The achromatic tube optics 11, 10 or the adapter 14 indicated in FIGS. 5 and 6 remain practically without influence on the transverse chromatic aberration (FIG. 16b), so that for both cases there results the course of the CHL shown in FIG. 16c, which is substantially identical to FIG. 16a.

Figure 15A:
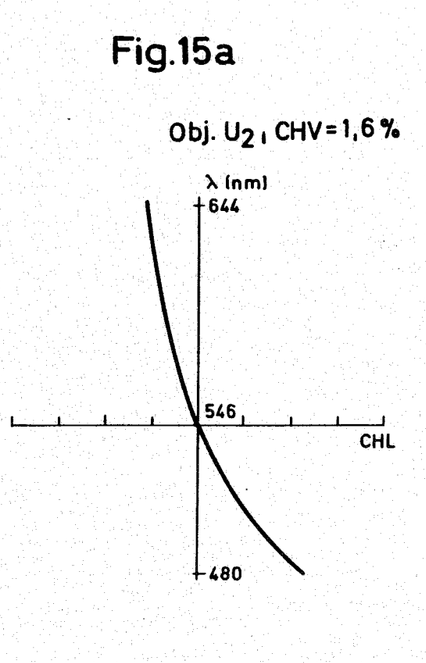
Figure 15B:
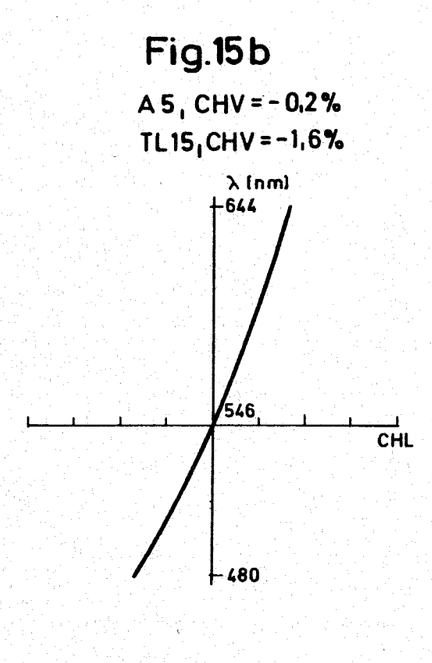
Figure 15C:
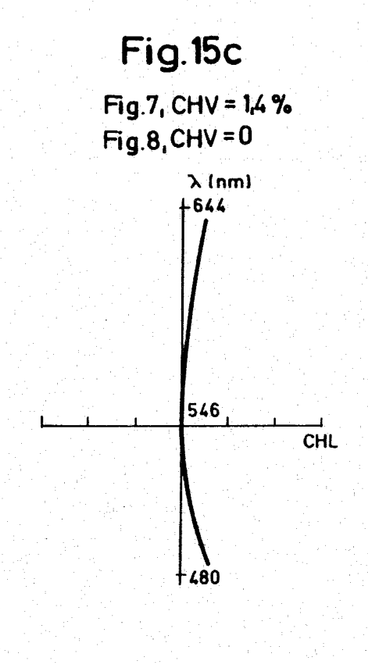

On the other hand, FIG. 15 (i.e. 15a, 15b, and 15c) shows the compensation of the chromatic aberrations of the objective U in accordance with an arrangement pursuant to FIG. 7 by the adapter 5 (FIG. 15b) which, with the same position as the adapter 3 in FIG. 3 and with the same dispersive behavior (see FIG. 12b) gives the result shown in FIG. 15c with a transverse chromatic aberration of 1.4%. The adapter 5 consists of a positive lens (f=46.5 mm; $v_d = 35.8$) and of a negative lens (f= −46.5; $v_d = 46.5$) which are cemented together.

In the arrangement illustrated in FIG. 8, the member 15, now belonging to the tube lens system and consisting of the same cemented member as the above mentioned adapter 5, assures a color-free intermediate image 8. The aberration compensation of this arrangement shon in FIG. 8 is also described by FIG. 15 (i.e. 15a, 15b, and 15c). The value for L which is changed as compared with FIG. 7 from about 10 mm to about 105 mm does not have any effect on the course of the CHL since the adapter 5 and the tube-lens system 15 are located in the parallel ray path region; there is thus again obtained the course of the CHL shown in FIG. 15b while the CHV of the objective 2 is in this case fully compensated (see equation 1).

For the correction of the objective U in FIG. 9, the showing of FIG. 14 (i.e. 14a, 14b, and 14c) is to be taken, in which connection the graph 40 there is replaced by the practically identical graph in FIG. 15b. The influence of the achromatic tube lens 10 (see FIG. 16b) can be neglected, so that the course of the CHL sketched in FIG. 14c also applies for the arrangement in accordance with FIG. 9.

What is claimed is:

1. Means for making optical systems for microscopes having objectives of infinite exit vertex focal length compatible with optical systems for microscopes having objectives of finite exit vertex focal length although the condition of chromatic correction of the respective objectives of the two systems with respect to transverse chromatic aberrations in an intermediate image may be different, the respective microscopes including tubes and objective housings, characterized by the fact that
   (a) optical elements in the form of adapters (3, 4, 14) are provided which are fastened to the objective housings,
   (b) the adapters for all objectives of one type, when used on similar tubes, have in each case the same dispersion and refractive power, and
   (c) the adapters (4, 14) for combination with objectives (1) of finite exit vertex focal length have a refractive power of negative sign, and the adapters (3) for combination with objectives (2) of infinite exit vertex focal length have a refractive power of the same magnitude but of positive sign.

2. The invention defined in claim 1, characterized by the fact that the dispersion and the refractive power of the positive adapters (3) are so selected that these properties are identical with those of the tube-lens system (20) which is used in the microscopes with objectives of infinite exit vertex focal length for production of the intermediate image.

3. The invention defined in claim 1, characterized by the fact that dispersion and refractive power of the negative adapters (4, 14) are so selected in amount that these properties agree with those of the tube-lens system (10, 20) to which the objectives (1) provided with these adapters are adapted.

4. The invention defined in claim 2, characterized by the fact that when dimensioning the adapters (3, 4, 5, 14) and the tube-lens system (20; 10; 10, 15) there is substantially satisfied the condition:

$$\sum_i \frac{L_i}{v_{di} \cdot f_i} = CHV$$

in which
   $v_d$ = the Abbe number of the glasses used in the lenses or cemented components,
   f = the focal length of the specific lenses or cemented components,
   L = the distance of their principal planes from the exit pupil of the objectives used in combination with the tube-lens system, and
   CHV = the transverse chromatic aberration of these lenses which is to be compensated.

5. The invention defined in claim 2, characterized by the fact that the tube-lens system (20) is a single-lens whose principal planes are spaced from the object (6) by 0.5 to 1.3 times its focal length.

6. The invention defined in claim 2, characterized by the fact that the adapters of negative refractive power (4) have a substantially over-corrected longitudinal chromatic aberration (CHL) and the adapters of positive refractive power (3) or of a refractive power of zero (5) have a substantially under-corrected longitudinal chromatic aberration (CHL).

7. The invention defined in claim 2, characterized by the fact that the adapters with positive or negative refractive power are achromatic.

8. The invention defined in claim 1, characterized by the fact that the adapters have a mount by which they are replaceably fastened to the objective housings.

9. Means for making optical systems for microscopes having objectives of infinite exit vertex focal length compatible with optical systems for microscopes having objectives of finite exit vertex focal length although the condition of chromatic correction of the respective objectives of the two systems with respect to transverse chromatic aberrations in an intermediate image may be different, the respective microscopes including tubes and objective housings, characterized by the fact that
   (a) optical elements in the form of adapters (3, 4, 14) are provided which are fastened to the objective housings,
   (b) the adapters for all objectives of one type, when used with similar tubes, have in each case the same dispersion and refractive power, and
   (c) the adapters (4, 14) for combination with objectives (1) of finite exit vertex focal length have a negative refractive power and the adapters (5) for combination with the objectives (2) of infinite exit vertex focal length have a refractive power of zero.

10. The invention defined in claim 9, characterized by the fact that the afocal adapters (5) have the same dispersion behavior as the tube-lens system (20) which is used in microscopes with objectives of infinite exit vertex focal length for the production of the intermediate image.

11. The invention defined in claim 9, characterized by the fact that dispersion and refractive power of the negative adapters (4, 14) are so selected in amount that these properties agree with those of the tube-lens system (10, 20) to which the objectives (1) provided with these adapters are adapted.

12. The invention defined in claim 10, characterized by the fact that when dimensioning the adapters (3, 4, 5, 14) and the tube-lens system (20; 10; 10, 15) there is substantially satisfied the condition:

$$\sum_i \frac{L_i}{v_{di} \cdot f_i} = CHV$$

in which
   $v_d$ = the Abbe number of the glasses used in the lenses or cemented components,
   f = the focal length of the specific lenses or cemented components,
   L = the distance of their principal planes from the exit pupil of the objectives used in combination with the tube-lens system, and
   CHV = the transverse chromatic aberration of these lenses which is to be compensated.

13. The invention defined in claim 10, characterized by the fact that the tube-lens system comprises a positive achromatic member (10) and an afocal dispersive member (15).

14. The invention defined in claim 13, characterized by the fact that the afocal dispersive member (15) is spaced from the object plane by a distance 0.5 to 1.3 times the focal length of the positive achromatic member (10).

15. The invention defined in claim 9, characterized by the fact that the adapters have a mount by which they are replaceably fastened to the objective housings.

* * * * *